(12) United States Patent
Satoh

(10) Patent No.: US 6,738,097 B2
(45) Date of Patent: May 18, 2004

(54) COMPOSITE VIDEO SIGNAL DECODER HAVING STRIPE COMPONENT JUDGING SECTION

(75) Inventor: Yasunori Satoh, Tokyo (JP)

(73) Assignee: Oki Electric Industry CO, Ltd., Tokyo (JP)

( * ) Notice: Subject to any disclaimer, the term of this patent is extended or adjusted under 35 U.S.C. 154(b) by 429 days.

(21) Appl. No.: 09/829,940

(22) Filed: Apr. 11, 2001

(65) Prior Publication Data

US 2002/0149702 A1 Oct. 17, 2002

(51) Int. Cl.[7] ................................................. H04N 9/78
(52) U.S. Cl. ....................................... 348/663; 348/665
(58) Field of Search ................................ 348/663, 665, 348/667, 668, 669, 670; 382/260; H04N 9/77, 9/78

(56) References Cited

U.S. PATENT DOCUMENTS 5,654,770 A * 8/1997 Hatano et al. ............... 348/668
5,909,255 A * 6/1999 Hatano ....................... 348/663
6,384,873 B1 * 5/2002 Rumereich et al. ......... 348/666

FOREIGN PATENT DOCUMENTS

| JP | 08-265794 | | 10/1996 |
| JP | 10-224816 | * | 8/1998 |

* cited by examiner

Primary Examiner—Sherrie Hsia
(74) Attorney, Agent, or Firm—Rabin & Berdo, P.C.

(57) ABSTRACT

The decoder for separation of Y (luminance) signals and C (color) signals from composite signals includes a correlation judging section. It is adapted to judge whether there is line correlation among neighboring signal lines including a signal line to be separated during each of the horizontal scanning intervals. A stripe component judging section is adapted to judge whether an image having vertical stripes is contained in the composite signal. A filter section having first and second filters is used selectively depending on correlation results, and a selecting section is adapted to output a signal to select one of filters in accordance with judgment results from both judging sections. The decoder is capable of preventing decreases in resolution in images having vertical stripes.

14 Claims, 3 Drawing Sheets

COMPOSITE VIDEO SIGNAL DECODER HAVING STRIPE COMPONENT JUDGING SECTION

BACKGROUND OF THE INVENTION

1. Field of the Invention

The present invention relates to a decoder for composite video signals, which is used to separate a luminance signal (Y) and a color signal (C) from a composite video signal containing the luminance signal (Y) and the color signal (C).

2. Description of the Related Art

For example, in an NTSC (National Television System Committee) color television system, a luminance signal (Y) and a color difference signal (C), which is a color signal, are contained in a composite video signal. In order to display an image by using the composite video signal, it is necessary to separate the luminance signal and the color difference signal from the composite video signal. For the separation of these signals, a decoder for composite video signals is used.

A conventional technology to perform the separation of the above two signals, that is, YC separation, is disclosed, for example, in Japanese Patent Application Laid-open Hei 8-265794. In the disclosed technology, a judgment is made as to whether there is line correlation among a plurality of neighboring signal lines including a signal line to be separated during each of horizontal scanning intervals of a composite signal. To obtain a color signal, either a trap filter adapted to allow a single predetermined frequency component to pass or a comb filter adapted to allow a plurality of frequency components to pass is selected, depending on the presence or absence of the correlation.

Therefore, prior to the selection of the filter, the correlation between the signal line to be separated and the signal line adjacent to the signal line to be separated is judged. In the above disclosed conventional technology, the correlation between these signal lines is judged not only by the use of data on color signal components of each of signal lines, but also by the use of data on color burst signals as a supplement method.

However, in the conventional technology, for example, when a composite signal indicating an image having vertical stripes not containing a color component such as a multi-burst signal is input, since the same frequency component as a color signal component contained in the composite signal and the frequency component of the neighboring line signal do not have opposite phases, the same frequency component as the color signal component is judged to have no correlation and, according to this judgement, the above trap filter is selected as the filter to obtain a color signal.

When the composite signal passes through the trap filter, the luminance signal (Y) is extracted and, at this point, the passage of a spectrum component in a high frequency band mainly including a color subcarrier related to the color signal component, for example, in the NTSC system, of a component in a frequency band having its center frequency at 3.58 MHz is inhibited. As a result, if the trap filter is used in order to separate the composite signal indicating the image having vertical stripes not containing the color component such as the multi-burst signal, the spectrum component in the band of high frequency out of a frequency component of the composite signal indicating the image having the vertical stripes is lost, thus causing a decrease in resolution of an image having stripes.

SUMMARY OF THE INVENTION

In view of the above, it is an object of the present invention to provide a decoder for composite video signals which is capable of preventing a decrease in resolution in the YC separation from the composite signal indicating an image having vertical stripes.

According to a first aspect of the present invention, there is provided a decoder for composite video signals for separating a luminance signal and a color signal from continuous composite signals including:

a correlation judging section used to judge presence or absence of line correlation among a plurality of signal lines including a signal line to be separated during each of horizontal scanning intervals of the composite signal;

a color component judging section used to judge whether a color component is contained in the composite signal;

a filter section having a first filter used to sequentially extract a color component signal contained in the composite signal of the signal line to be separated, based on a relation of the composite signal between the signal line to be separated and other signal line being adjacent to the signal line to be separated and a second filter used to sequentially extract a color component signal contained in the composite signal of the signal line to be separated; and a selecting section used to output a selecting signal to select either of the two filters depending on judgement results from the correlation judging section and from the color component judging section to the filter section.

In the foregoing, a preferable mode is one wherein the correlation judging section judges whether there is line correlation between the signal line to be separated and the signal line being adjacent to the signal line to be separated and wherein the color component judging section serves as a stripe component judging section to judge whether an image component having stripes is contained in the composite signal to be judged.

Also, a preferable mode is one wherein the selecting section, when receiving, from the correlation judging section, a judgement result showing that there is no line correlation between the signal lines being adjacent to each other and when receiving, from the stripe component judging section, a judgement result showing that image components having vertical stripes are contained, selects the first filter, and when receiving, from the correlation judging section, the judgement result showing that there is no line correlation between the signal lines being adjacent to each other and when receiving, from the stripe component judging section, a judgement result showing that image components having vertical stripes are not contained, selects the second filter.

Also, a preferable mode is one wherein the selecting section, when receiving, from the correlation judging section, the judgement result showing that there is line correlation between the signal lines being adjacent to each other, irrespective of the judgement result from the stripe component judging section, selects the first filter.

Also, a preferable mode is one wherein the first filter is a comb filter which allows a spectrum frequency component constituting a color component signal contained in the composite signal and the second filter is a trap filter which allows a frequency component in a single frequency band containing a central frequency of the spectrum frequency component constituting the color component signal.

Also, a preferable mode is one wherein the stripe component judging section is provided with a pixel correlation judging circuit to judge whether there is correlation among neighboring pixels of the one continuous signal line to be separated.

Also, a preferable mode is one wherein the pixel correlation judging circuit is provided so as to correspond to each of a plurality of the signal lines and the stripe component judging section is provided with a processing section used to obtain a judgement result from the stripe component judging section based on the judgement results from each of the pixel correlation judging circuits and to output the judgement result as a result to be used for selection of the filter to the selecting section.

Also, a preferable mode is one wherein the pixel correlation judging circuit is provided with a plurality of time delaying devices used to obtain a plurality of continuous pixel signals of the signal line, a subtractor used to obtain a differential between both continuous pixel signals and a comparing section used to judge whether a differential obtained by the subtractor is not more than a threshold value and to output a judgement result as a result of the pixel correlation judgement to the processing section.

Also, a preferable mode is one wherein the time delaying device is made up of flip-flops and wherein the comparing section outputs, based on outputs from each of subtractors used to obtain the differential between pixel signals of lines existing before and after each of the flip-flops.

Also, a preferable mode is one wherein the stripe component judging section, when the correlation judging section has output the judgement result showing that there is line correlation among neighboring signal lines, is placed in a rest state and when the correlation judging section has output the judgement result showing there is no line correlation among neighboring signal lines, is placed in an operating state.

Also, a preferable mode is one wherein the stripe component judging section judges presence or absence of line correlation between signal lines which the one signal line to be separated is disposed between.

Also, a preferable mode is one wherein the stripe component judging section is provided with an adder used to do addition of composite signals of both the signal lines and with an substractor used to do subtraction of composite signals of both the signal lines and wherein the stripe component judging section outputs a judgement result showing whether stripe components are contained in composite signals of the signal line to be separated, based on output values from the adder and the subtractor, to the selecting section.

Also, a preferable mode is one wherein the stripe component judging section receives output values from the adder and the subtractor and is provided with a processing section which, when the output value from the adder is not less than a predetermined threshold value and the output value from the subtractor is not more than the predetermined threshold value, outputs a judgement result showing that image components having vertical stripes are contained to the selecting section.

Also, a preferable mode is one wherein the stripe component judging section, when the correlation judging section has output the judgement result showing that there is line correlation among neighboring lines, is placed in a rest state and, when the correlation judging section has output the judgement result showing that there is no line correlation among neighboring lines, is placed in an operation state.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

Embodiment

Figure 1:
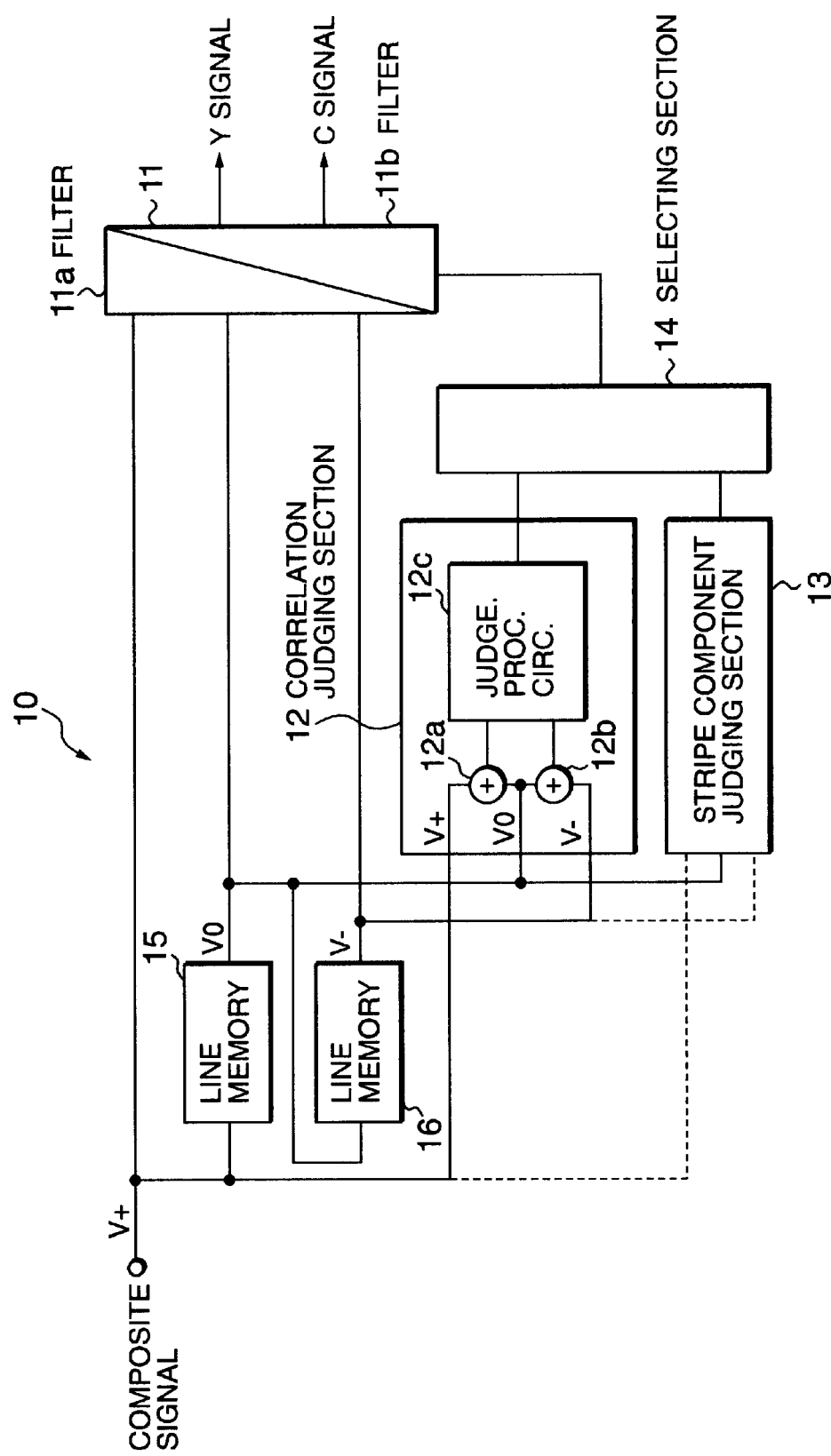
FIG. 1 is a schematic block diagram showing configurations of a decoder for composite video signals of the present invention.

FIG. 1 shows a decoder for digital composite video signals of the present invention which is adapted to separate a luminance signal (Y) and a color signal (C) from the composite video signal.

As shown in FIG. 1, the decoder for composite video signals 10 includes a filter section 11 having a filter 11a and a filter 11b used to separate the luminance signal (Y) and color signal (C) from the composite video signal.

The decoder 10 further includes a correlation judging section 12 used to judge correlation of a color component contained in the composite video signal, on the basis of which either of the filter 11a or the filter 11b is selected to perform the YC separation. A stripe component judging section 13 is used to judge whether the composite video signal contains a component of an image having vertical stripes. A selecting section 14 is used to output a selecting signal showing which filter, the filter 11a or the filter 11b, is to be used, to the selecting section 14, in response to judgment results from the correlation judging section 12 and from the stripe component judging section 13.

To the filter section 11 and to the correlation judging section 12 of the decoder 10 are fed the composite video signal V+, a composite signal V0 which has passed through a line memory 15 adapted to delay the video signal by one horizontal scanning interval and a composite signal V– which has passed through a line memory 16 adapted to delay the video signal by one horizontal scanning interval. To the stripe component judging section 13 is fed the above composite signal V0. Moreover, to the stripe component judging section 13 may be fed the composite signal V+ and the composite signal V–, instead of the composite signal V0.

As is well known, every time a component of the color signal contained in the composite signal passes through the line memories 15 and 16, its phase is reversed, while a phase of a composite of the luminance signal contained in the composite signal is not reversed.

Of the three kinds of signals including the composite video signal V–, the composite video signal V0 and the composite video signal V+, among which a time lag exist, if the composite video signal V+ having passed through the line memory 15 is a line signal to be separated, two signals including a color signal (C) contained in the composite signal V0 flowing through a line to be separated and a color signal (C) contained in the composite signal V– flowing through a line which exists, by one line, before the line through which the composite signal V0 is flowing have opposite phases, while two signals including a luminance signal (Y) contained in the composite signal V0 flowing through a line to be separated and a luminance signal (Y) contained in the composite signal V– flowing through a line which exists, by one line, before the line through which the composite signal V0 is flowing are in phase.

Similarly, two signals including a color signal (C) contained in the composite signal V0 flowing through a line to be separated and a color signal (C) contained in the composite signal V+ flowing through a line which exists, by one line, after the line through which the composite signal V0 is flowing have opposite phases, while two signals including a luminance signal (Y) contained in the composite signal V0 flowing through a line to be separated and a luminance signal (Y) contained in the composite signal V+ flowing through a line which exists, by one line, before the line through which the composite signal V0 is flowing are in phase.

On the other hand, two signals including a color signal (C) contained in the composite signal V+ flowing through the line existing before the line through which the composite signal V0 to be separated is flowing and a color signal (C) in the composite signal V− through the line existing after the line through which the composite signal V0 to be separated is flowing are in phase and, similarly, two signals including a luminance signal (Y) contained in the composite signal V+ flowing through the line existing before the line through which the composite signal V0 to be separated is flowing and a luminance signal (Y) in the composite signal V− through the line existing after the line through which the composite signal V0 to be separated is flowing are in phase.

As is well known, the correlation judging section 12 is provided with a judgement processing circuit 12c adapted, when the correlation judging section 12 simultaneously receives the three kinds of signals including the line signal V+, line signal V0 and line signal V−, to judge whether there is correlation between the line signal V+ and the line signal V0 being adjacent to each other and correlation between the line signal V0 and the line signal V− being adjacent to each other, based on added values made up of values obtained by addition, by an adder 12a, of a value of the line signal V+ and a value of the line signal V0 flowing respectively through each of the two lines adjacent to each other and of values obtained by addition, by an adder 12b, of a value of the line signal V0 and a value of the line signal V− flowing respectively through each of the two lines adjacent to each other. That is, each of the adders 12a and 12b in the correlation judging section 12 does addition of the value of each of line signals (V+, V0 and V−) flowing through signal lines adjacent to each other.

As described above, since the two color signals (C) flowing through the two lines adjacent to each other have opposite phases, as is well known, if waveforms of these two color signals having opposite phase are the same, a result obtained by addition of components of the two color signals becomes 0 (zero). Therefore, the judgement processing circuit 12c of the correlation judging section 12, if the result obtained by the addition of color signal components is not more than a threshold value, outputs a result that there is no correlation between the two line signals and, if the result obtained by the addition of color signal components exceeds the threshold value, outputs a result that there is correlation between the two line signals, to the selecting section 14.

In the example shown in FIG. 1, the correlation judging section 12, after receiving the three kinds of the line signal V+, V0 and V−, transfers the result of the judgement as to whether there is correlation in components of the color signal between the line signal V+ and V0 and between the line signal V0 and the line signal V− to the selecting section 14.

The stripe component judging section 13, when receiving the line signal V0 to be separated, makes a judgement on the correlation among a plurality of continuous pixel signals contained in the line signal V0. That is, the stripe component judging section 13 calculates a differential between pixel signals being adjacent to each other, of the line signal V0 to be separated by doing subtraction using a subtractor (not shown). Preferably, the calculation to obtain the differential between pixel signals being adjacent to each other is performed among three different pairs of pixel signals each being adjacent to each other. Generally, when the line signal V0 contains a signal indicating an image having vertical stripes, since the line signal has information representing some image, a comparatively great change occurs among the plurality of pairs of pixel signals, each being adjacent to each other, contained in the line signal. Therefore, basically, when the differential is compared with a proper threshold, if the differential is smaller than the threshold value, it can be judged that the line signal V0 is not a signal indicating an image having stripes, while, if the differential is larger than the threshold value, it can be judged that the line signal V0 is a signal indicating an image having stripes. By setting the proper value as the threshold value, wrong judgement can be avoided, without being affected by feeble noises contained in the line signal.

The stripe component judging section 13 judges, based on the differential among the plurality of pairs of pixel signals, each being adjacent to each other, contained in the line signal V0 as described above, whether the line signal V0 is the signal indicating the image having stripes or not. The result of the stripe component judging section 13 is output to the selecting section 14.

The stripe component judging section 13 can judge whether the line signal V0 to be separated is a signal indicating an image having stripes, by using, instead of the line signal V0 to be separated, the line signal V+ shown by a broken line and the line signal V− also shown by the-broken line, of the lines each existing before and after the line having the line signal V0.

Generally, two color signals (C) one being contained in the line signal line V+ and the other being contained in the signal line V− do not have opposite phases and, similarly, two luminance signals (Y) one being contained in the line signal line V+ and the other being contained in the signal line V− also do not have opposite phases.

Therefore, if each of the line signal V+ and the line signal V− is a signal indicating an image having stripes, when addition is done between the line signal V+ and the line signal V−, since both the two luminance signals (Y) contained in the line signals V+ and V− and the two color signals (C) contained in the line signals V+ and V− do not have opposite phases, the result from the addition of the two signals does not become a comparatively large value other than 0 (zero). Moreover, if each of the line signal V+ and line signal V− is a signal indicating an image having vertical stripes, when subtraction is done between the two line signal, since both the two luminance signals (Y) contained in the line signals V+ and V− and the two color signals (C) contained in the line signals V+ and V− do not have opposite phases, the result from the subtraction ideally becomes 0 (zero) because levels of the two line signals V+ and V− are offset.

On the other hand, each of the line signals V+ and V− is a signal indicating no image, since components of the color signal (C) and the luminance signal (Y) have no value, a result from addition or subtraction between the two line signals V+ and V− ideally becomes 0 (zero). Even if each of the line signals V+ and V− has a signal component indicating an image, if the image has a pattern other than stripes, a value obtained by adding the line signal V+ and V− becomes a comparatively large value other than 0 (zero) and the result from the subtraction is not 0 (zero).

Therefore, basically, if a value obtained by addition between the line signals V+ and V− is not 0 (zero) and a value obtained by subtraction between the line signals V+ and V− is 0 (zero), it can be judged that the line signal V0 of the line existing between the lines each having the line signals V+ and V− is a signal indicating an image having vertical stripes. Thus, when the value obtained by addition between the line signals V+ and V− is approximately 0 (zero) and the value obtained by subtraction between the line signal V+ and V− is a value exceeding a threshold set with considerations given to noises, it can be judged that the line signal V0 of the line existing between the lines having respectively the line signals V+ and V− is a line signal indicating an image having vertical stripes. This means that the stripe component judging section can judge, by using the line signals V+ and V−, whether the line signal V0 of the line existing between the lines having the line signals V+ and V−, respectively, is a line signal indicating the image having vertical stripes.

The stripe component judging section 13, by using either of the judging methods described above, judges whether the line signal V0 to be separated is the line signal indicating the image having stripes and outputs the result to the selecting section 14.

Therefore, the selecting section 14 receives the results of the judgement from the correlation judging section 12 and the stripe component judging section 13. The selecting section 14, when receiving, from the correlation judging section 12, the result indicating that there is line correlation between at least one pair of signal lines being adjacent to each other, regardless of the result from the stripe component judging section 13, outputs an instruction to the filter section 11 that a two-line or three-line comb filter should be selected.

Moreover, the selecting section 14, when receiving the result, from the correlation judging section 12, showing that there is no correlation between any pairs of signal lines being adjacent to each other and the result, from the stripe component judging section 13, showing that the signal line V0 do not contain a signal indicating an image having stripe components, outputs an instruction to the filter section that the trap filter should be selected and, when receiving the result, from the correlation judging section 12, showing that there is no correlation between any pairs of signal lines being adjacent to each other and the result, from the stripe component judging section 13, showing that the signal line V0 contains a signal indicating an image having stripes, outputs to the filter section 11 that the comb filter should be selected.

Therefore, when the correlation section 12 judges that there is correlation between signal lines being adjacent to each other, the filter section 11, as is well known, using the two-line or three-line comb filter, performs the YC selection from the line signal V0 to be separated. That is, if there is correlation between only either of the pairs of signal lines being adjacent to each other, as is well known, the two-line comb filter is used. If there is correlation between both pairs of the signal lines being adjacent to each other, as is well know, the three-line comb filter is used.

On the other hand, even if the correlation judging section 12 shows a judgement result that there is "no correlation", when the strip component judging section 13 shows a judgement result that "a signal indicating image having a stripe component" is contained, the filter section 11, as in the above case, using the two-line or three-line comb filter, performs the YC separation from the line signal V0 to be separated. Moreover, the filter section 11, when the correlation judging section 12 shows the judgment result that there is "no correlation" and only when the stripe component judging section 13 shows a judgement result that that the "signal indicating an image having a stripe component" is not contained, as in the conventional case, using the trap filter, performs the YC separation of the line signal V0 to be separated.

In the decoder 10 of the present invention, as described above, even when the correlation judging section 12 shows the judgement result that there is "no correlation", if the stripe component judging section 13 shows the judgement result that the signal indicating an image having the stripe component is contained, the YC separation from the line signal V0 to be separated is performed by the comb filter, not by the trap filter. Therefore, since, unlike in the case of the conventional decoder, the use of the trap filter for the line signal V0 containing the signal showing the image having the vertical strip is avoided, a loss of a spectrum component in a band of high frequency in the line signal V0 caused by the use of the trap filter and a decrease in resolution in the image having vertical strips caused by the loss can be also prevented and further the occurrence of a cross-color can be avoided.

Figure 2:
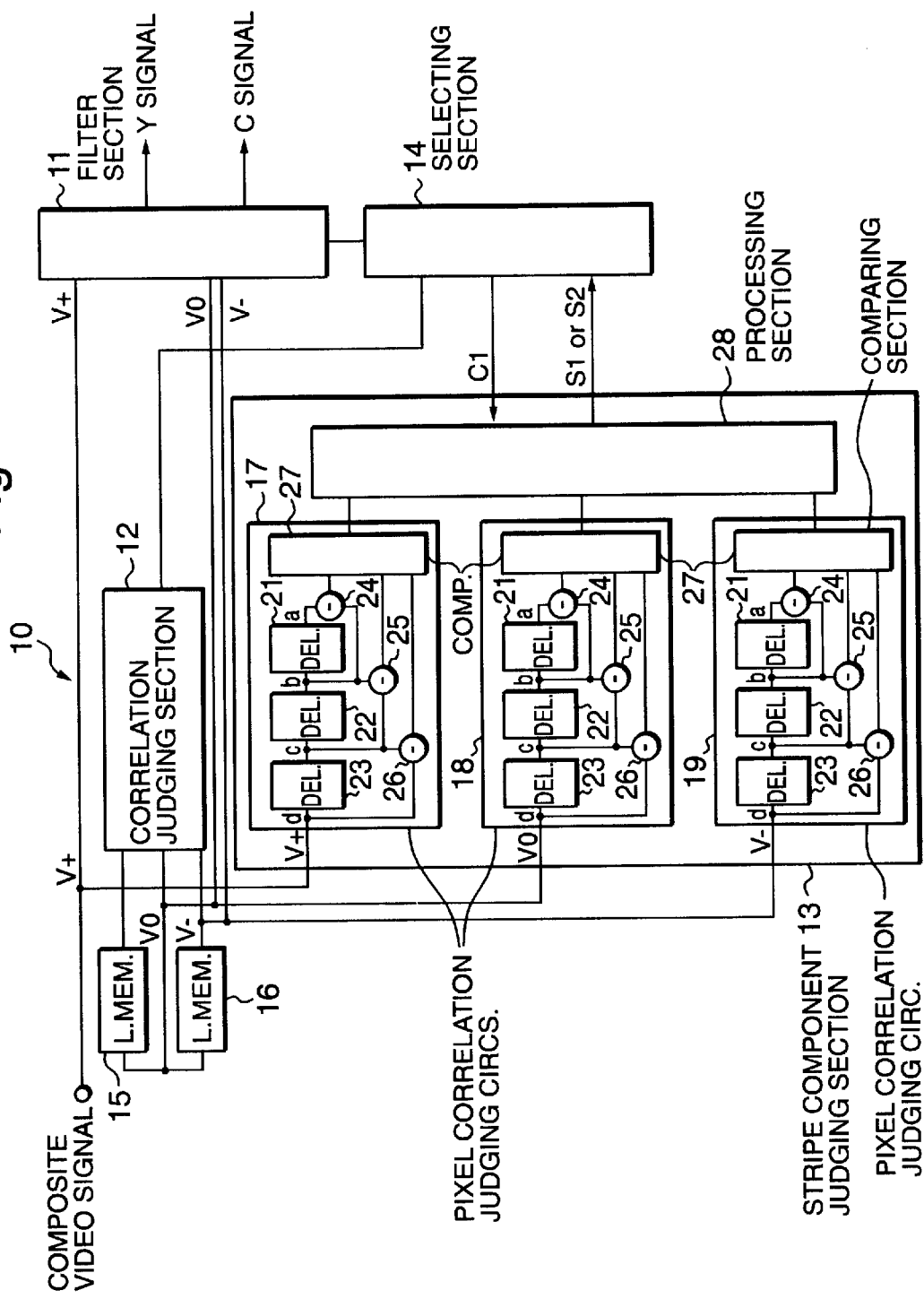
FIG. 2 is a schematic block diagram showing configurations of the decoder for composite video signals according to a first embodiment of the present invention.

Next, configurations of the stripe component judging section 13 will be described in detail by referring to FIGS. 2 and 3. As shown in FIG. 2, the stripe component judging section 13 is provided with three pixel correlation judging circuits 17, 18 and 19 used to judge whether there is correlation among three pairs of neighboring continuous pixel signals contained in each of line signals.

The pixel correlation judging circuit 17 connected to the signal line V+ has three time delaying devices 21, 22 and 23 made up of, for example, flip-flops, each being connected in series and being adapted to delay continuous pixel signals contained in the signal line V+. The pixel correlation judging circuit 17 includes subtractors 24, 25 and 26 used to calculate a differential in pixel signals among the three time delay devices 21, 22 and 23. Each of the subtractors 24, 25 and 26 calculates a differential among three pairs of pixel signals (a–b, b–c and c–d) of lines each existing before or after the flip-flops 21, 22 and 23.

The pixel correlation judging circuit 17 also have a comparing section 27 used to compare each of differentials obtained by each of the subtractors 24, 25 and 26 with a threshold value. As described above, when continuous pixels are components showing an image having stripes, the differential between pixel signals being adjacent to each other becomes a comparatively large value. On the other hand, when continuous pixels are not components showing an image having stripes, the differential between pixel signals being adjacent to each other becomes a comparatively small value. Therefore, by setting a proper value as the threshold value, it is judged that, if either of the differentials exceeds the threshold value, there is no correlation, that is, the line signal that the pixel correlation judging circuit 17 handles is a signal line indicating an image having stripes, while, if all of the differentials do not exceed the threshold value, there is correlation, that is, the line signal that the pixel correlation judging circuit 17 handles is not a line signal indicating an image having stripes.

Therefore, by properly selecting the threshold value, the comparing section 27 can output a result of the judgement as to presence or absence of the pixel correlation depending on the differential.

In the example shown in FIG. 2, the pixel correlation judging circuits 18 and 19 each having the same configuration as that of the pixel judging circuit 17 and each handling the line signal V0 and the line signal V− respectively are provided. Judgement results from each of the comparing sections 27 of the pixel correlation judging circuits 17, 18 and 19 are output to the processing section 28.

The processing section 28, when obtaining the judgement results from each of the comparing sections 27 of the pixel correlation judging circuits 17, 18 and 19, so long as the judgement results show that there is correlation, outputs a judgement result (S1) showing that the line signal indicates an image having stripe component.

The processing section 28, when not receiving the judgement result from all the comparing sections 27 of the pixel correlation judging circuits 17, 18 and 19, outputs a judgement result (S2) showing that the line signal does not indicate an image having stripe component.

The selecting section 14 receives the judgement result regarding the line correlation, as in the case described in FIG. 1, from the pixel correlation judging section 12 and the judgement result regarding images having stripe components from the processing section 28.

The selecting section 14, as described by referring to FIG. 1, when having received the judgement result showing that there is correlation between signal lines being adjacent to each other making up at least one pair of the signal lines, irrespective of the judgement result from the stripe component judging section, outputs an instruction that the two-line or three-line comb filter should be selected to the filter section 11.

Moreover, the selecting section 14, when receiving the judgement result showing that there is no line correlation among any neighboring lines from the pixel correlation judging section 12 and when receiving the judgement result showing that no stripe component is contained, from the stripe component judging section 13, outputs an instruction that the trap filter should be selected by the filter section 11, and when receiving the judgement result showing that there is no line correlation between signal lines being adjacent to each other from the pixel correlation judging section 12 and when receiving the judgement result showing that the stripe component is contained from the strip component judging section 13, outputs an instruction that the comb filter should be selected to the filter section 11.

Therefore, as in the case described by referring to FIG. 1, when the pixel correlation judging section 12 judges that there is correlation, the filter section 11, as is well known, performs the YC separation from the line signal V0 to be separated by using the two-line or three-line comb filter.

On the other hand, even if the pixel correlation judging section 12 produces a judgement result that "there is no correlation", when the stripe component judging section 13 produces a judgement result that "the stripe component is contained in the signal", the filter section 11 performs the YC separation from the line signal V0 to be separated using the two-line or three-line comb filter. The filter section 11 performs the YC separation from the line signal V0 to be separated using the trap filter, as in the conventional case, only when the pixel correlation judging section 12 produces the judgement result showing that "there is no correlation" and the stripe component judging section 13 produces the judgement result showing that "the stripe component is not contained in the signal".

In the decoder 10 of the present invention, as described above, even if the pixel correlation judging section 12 produces the judgement result showing that "there is no correlation", when the stripe component judging section 13 produces the judgement result, based on the differential among neighboring pixels contained in each line signal, showing that "the stripe component is contained in the signal", the filter section 11 performs the YC separation from the line signal V0 to be separated using not the trap filter but the comb filter. Therefore, unlike in the case of the conventional decoder, since the use of the trap filter for the line signal V0 containing the signal showing the image having the vertical strip can be avoided, it is possible to prevent a loss of a spectrum component in a band of high frequency in the line signal V0 caused by the use of the trap filter, a decrease in resolution in the image having vertical strips caused by the loss and the occurrence of a cross-color.

In the example shown in FIG. 2, three flip-flops 21, 22 and 23 are provided to each of the signal lines V+, V0 and V−, however, in order to improve accuracy of judging stripes, if necessary, more flip-flops can be connected at multiple stages.

While the decoder for video signals 10 is being operated, the pixel correlation judging section 12 and the stripe component judging section 13 are placed in an ordinary operation state. However, as described above, the judgement result of the stripe component judging section 13 is handled by the selecting section 14 only when the pixel correlation judging section 12 has produced the result of the judgement showing that "there is no correlation".

The selecting section 14, when receiving the judgement result that "there is no correlation" from the pixel correlation judging section 12, outputs a switching signal (C1) to the stripe component judging section 13 and, in response to the switching signal (C1), operations of the pixel correlation judging section 12 can be switched from an idle state to an ordinary operation state.

Since the stripe component judging section 13 can be kept in an idle state by control using the above switching signal C1, so long as the pixel correlation judging section 12 does not output the judgement result that "there is no correlation", reduced power consumption can be implemented.

Figure 3:
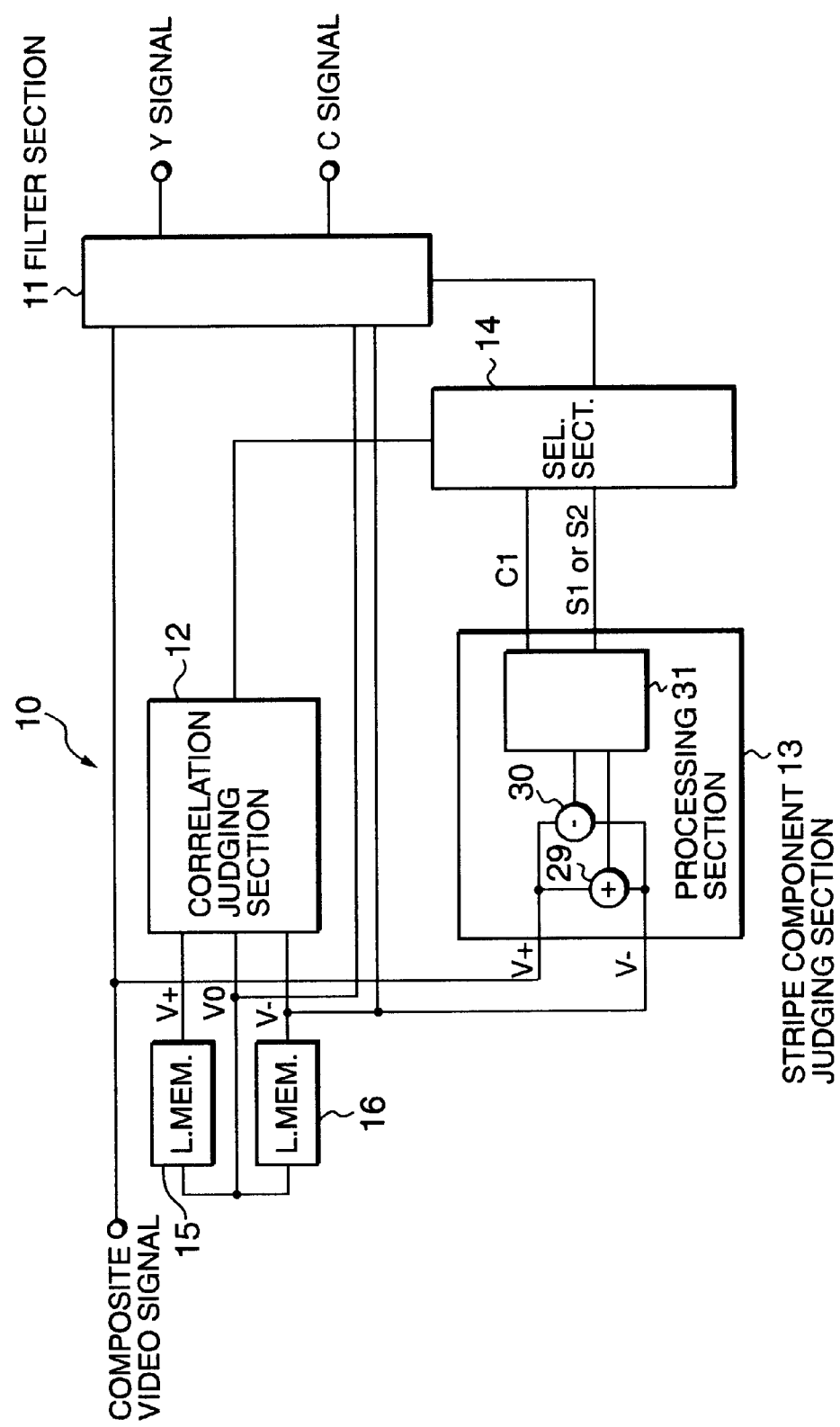
FIG. 3 is a schematic block diagram showing configurations of the decoder for composite video signals according to a second embodiment of the present invention.

The stripe component judging section 13, as shown in FIG. 3, judges, using the line signal V+ and line signal V− of the lines each existing before and after the line having the line signal V0 to be separated, that is, to be judged, whether the line signal V0 to be separated is a line signal showing an image having stripes or not.

The stripe component judging section 13, as shown in FIG. 3, is provided with an adder 29 used to do addition of the line signal V+ and V− of the lines existing before and after the line having the line signal V0, with a subtractor 30 used to calculate differentials by doing subtraction between the line signals V+ and V− of the lines existing before and after the line having the line signal V0 respectively and with a processing section 31 used to process results of the calculation from the adder 29 and subtractor 30.

As described above, if the line signals V+ and V− are the line signal indicating an image having vertical stripes, when the addition of the line signals V+ and V− is done, since the phases of the luminance signals (Y) and color signals (C) are not reversed, the result from the addition becomes a comparatively large value other than 0 (zero). Moreover, if the line signal V+ and V− are the line signal indicating an image having vertical stripes, when the subtraction between the line signal V+ and V− is done, since the phases of the luminance signals (Y) and color signals (C) are not reversed, the result from the subtraction shows an offset between the line signal V+ and V− and ideally it becomes 0 (zero).

On the other hand, if the line signals V+ and V− are line signals indicating no image, since components of the color signal (C) and the luminance signal (Y) have no value, when the addition and subtraction between the line signals V+ and V− are done, the result ideally becomes 0 (zero). Moreover, even if the line signals V+ and V− have signal components, if the component has a pattern other than stripes, a value obtained by doing addition of the line signals V+ and V− becomes a comparatively large value other than 0 (zero) and a value obtained by doing subtraction of the line signals V+ and V− become a value other than 0 (zero).

Based on the judging principle described above, the processing section 31, when the result from the addition by the adder 29 is larger than 0 (zero), that is, larger than the threshold value and the result from the subtraction by the subtractor 30 is smaller than 0 (zero), that is, smaller than the threshold value, outputs the judgement result that the line signal V0 existing between the line signals V+ and V− is the line signal indicating the image having vertical stripes to the selecting section 14.

In the decoder 10 of the present invention, as shown in FIG. 3, even if the pixel correlation judging section 12 produces the judgement result showing that "there is no correlation", when the stripe component judging section 13 produces, based on the results of calculation processing of signals of both lines existing before and after the line for the line signal to be judged, the judgement result showing that "the stripe component is contained in the signal", as in the case shown in FIG. 2, the YC separation from the line signal V0 to be separated is performed using not the trap filter but the comb filter.

Therefore, in the decoder 10 of the present invention shown in FIG. 3, as described above, even if the pixel correlation judging section 12 produces the judgement result showing that "there is no correlation", when the stripe component judging section 13 produces the judgement result showing that "the stripe component is contained in the signal", the trap filter is not used for the YC separation from the line signal V0 to be separated but the comb filter is used for the same, thus preventing the decrease in resolution caused by the improper filter and surely preventing the occurrence of the cross-color, thereby enabling more accurate YC separation.

Moreover, in the decoder 10 of the present invention shown in FIG. 3 (second embodiment), configurations of the stripe component judging section 13 can be made more simplified when compared with the example shown in FIG. 2 (first embodiment), thus enabling the decoder 10 to be compact which serves to reduce power consumption.

Even in the example decoder shown in FIG. 3, its selecting section 14, when receiving the judgement result showing that "there is no correlation" from the pixel correlation judging section 12, outputs the switching signal C1 to the stripe component judging section 12 and, in response to the switching signal, operations of the pixel correlation judging section 12 can be switched from an idle state to an ordinary state.

As described above, according to the decoder of the present invention, for the selection of the proper filter required for the YC separation from the composite signal, not only the judgement result from the correlation judging section showing whether there is line correlation in color components among neighboring signal lines including a signal line to be separated during each of horizontal scanning intervals but also the judgement result from the stripe component judging section showing whether image components having stripes are contained in the composite signal is taken into consideration. As a result, even if the composite signal indicating images having vertical stripes including multi-burst signals is judged by the correlation judging section to have no correlation, since the comb filter, not the trap filter, can be used, based on the judgement result from the stripe component judging section, for the YC separation from the composite signal indicating images having vertical stripes, decreases in resolution and occurrence of cross-colors can be surely prevented, thus achieving more accurate YC separation.

It is apparent that the present invention is not limited to the above embodiments but may be changed and modified without departing from the scope and spirit of the invention. For example, in the above examples, the decoder 10 is used for the digital video signal, however, the decoder of the present invention can be applied to analog video signals.

What is claimed is:

1. A decoder for compositive video signals for separating a luminance signal and a color signal from a continuous composite signals having horizontal scanning intervals, comprising:

a correlation judging section used to judge a presence or absence of line correlation among a plurality of signal lines including a signal line to be separated during each of the horizontal scanning intervals of said composite signal;

a color component judging section used to judge whether a color component is contained in said composite signal;

a filter section having a first filter used to sequentially extract a color component signal contained in said composite signal of said signal line to be separated, based on a relation of said composite signal between said signal line to be separated and another signal line being adjacent to said signal line to be separated, and a second filter used to sequentially extract a color component signal contained in said composite signal of said signal line to be separated; and a selecting section used to output a selecting signal to select either of said two filters depending on judgement results from said correlation judging section and from said color component judging section to said filter section.

2. The decoder according to claim 1, wherein said correlation judging section judges whether there is line correlation between said signal line to be separated and said signal line adjacent to said signal line to be separated and wherein said color component judging section serves as a stripe component judging section to judge whether an image component having stripes is contained in said composite signal to be judged.

3. The decoder according to claim 2, wherein said selecting section, when receiving, from said correlation judging section, a judgment result showing that there is no line correlation between said signal lines being adjacent to each other and when receiving, from said stripe component judging section, a judgment result showing that image components having vertical stripes are contained, selects said first filter, and when receiving, from said correlation judging section, said judgment result showing that there is no line correlation between said signal lines being adjacent to each other and when receiving, from said stripe component judging section, a judgment result showing that image components having vertical stripes are not contained, selects said second filter.

4. The decoder according to claim 2, wherein said stripe component judging section is provided with a pixel correlation judging circuit to judge whether there is correlation among neighboring pixels of said signal line to be separated.

5. The decoder according to claim 4, wherein said pixel correlation judging circuit is provided so as to correspond to each of a plurality of said signal lines and said stripe component judging section is provided with a processing section used to obtain a judgment result from said stripe component judging section based on said judgment results from each of said pixel correlation judging circuits and to output said judgment result as a result to be used for selection of said filter to said selecting section.

6. The decoder according to claim 5, wherein said pixel correlation judging circuit is provided with a plurality of time delaying devices used to obtain a plurality of continuous pixel signals of said signal line, a subtractor used to obtain a differential between both continuous pixel signals and a comparing section used to judge whether a differential obtained by said subtractor is not more than a threshold value and to output a judgment result as a result of said pixel correlation judgment to said processing section.

7. The decoder according to claim 6, wherein said time delaying devices are made up of flip-flops and wherein said comparing section outputs, based on outputs from each of subtractors used to obtain said differential between pixel signals of lines existing before and after said flip-flops.

8. The decoder according to claim 2, wherein said stripe component judging section, when said correlation judging section has output said judgment result showing that there is line correlation among neighboring signal lines, is placed in a rest state and when said correlation judging section has output said judgment result showing there is no line correlation among neighboring signal lines, is placed in an operating state.

9. The decoder according to claim 2, wherein said stripe component judging section judges a presence or absence of line correlation between signal lines which said signal line to be separated is disposed between.

10. The decoder according to claim 9, wherein said stripe component judging section is provided with an adder used to do addition of composite signals of both said signal lines and with an subtractor used to do subtraction of composite signals of both said signal lines and wherein said stripe component judging section outputs a judgment result showing whether stripe components are contained in composite signals of said signal line to be separated, based on output values from said adder and said subtractor, to said selecting section.

11. The decoder according to claim 10, wherein said stripe component judging section receives output values from said adder and said subtractor and is provided with a processing section which, when said output value from said adder is not less than a predetermined threshold value and said output value from said subtractor is not more than said predetermined threshold value, outputs a judgment result showing that image components having vertical stripes are contained to said selecting section.

12. The decoder according to claim 9, wherein said stripe component judging section, when said correlation judging section has output said judgment result showing that there is line correlation among neighboring lines, is placed in a rest state and, when said correlation judging section has output said judgment result showing that there is no line correlation among neighboring lines, is placed in an operation state.

13. The decoder according to claim 1, wherein said selecting section, when receiving, from said correlation judging section, said judgment result showing that there is line correlation between said signal lines being adjacent to each other, irrespective of said judgment result from said stripe component judging section, selects said first filter.

14. The decoder according to claim 1, wherein said first filter is a comb filter which allows a spectrum frequency component constituting a color component signal contained in said composite signal and said second filter is a trap filter which allows a frequency component in a single frequency band containing a central frequency of said spectrum frequency component constituting said color component signal.

* * * * *